United States Patent [19]

Bendler et al.

[11] 4,271,747
[45] Jun. 9, 1981

[54] FASTENING ELEMENT WITH A CAVITY CONTAINING AN EXPLOSIVE CHARGE

[75] Inventors: Hellmut Bendler, Furth; Axel Homburg, Taunusstein; Horst Penner, Furth, all of Fed. Rep. of Germany

[73] Assignee: Dynamit Nobel Aktiengesellschaft, Troisdorf, Fed. Rep. of Germany

[21] Appl. No.: 913,685

[22] Filed: Jun. 8, 1978

[51] Int. Cl.³ .................... B23P 19/00; F16B 15/00
[52] U.S. Cl. .................................. 411/20; 411/440; 411/455
[58] Field of Search ............... 85/DIG. 1, 37, 10 E, 85/65; 89/1 B

[56] References Cited

U.S. PATENT DOCUMENTS

| | | | |
|---|---|---|---|
| 2,064,503 | 12/1936 | Temple | 85/10 E |
| 2,455,825 | 12/1948 | Temple | 85/10 E |
| 2,556,465 | 6/1951 | Burrows et al. | 85/65 |
| 4,102,238 | 7/1978 | Thorner | 85/10 E |

FOREIGN PATENT DOCUMENTS

| | | | |
|---|---|---|---|
| 1535110 | 6/1968 | France | 85/10 E |
| 595276 | 12/1947 | United Kingdom | 85/65 |

*Primary Examiner*—Thomas J. Holko
*Attorney, Agent, or Firm*—Craig and Antonelli

[57] ABSTRACT

A fastening element having a cavity containing an explosive charge arranged so that, upon explosion of the explosive charge, anchoring of the fastening element in a bore of a workpiece takes place automatically. This fastening element functions both as a rivet and nail in combination and comprises sleeve means defining the cavity containing the explosive charge at one end and providing an aperture at the other end, and a nail disposed within the sleeve means, said nail comprising a head, shank and a tip and being arranged to be driven outside the aperture formed in the other end of the sleeve means. The head of the nail acts as a piston which can be driven by explosion of the explosive charge and as a stop which arrests the driving-out movement when the shank of the nail has passed through said aperture.

21 Claims, 4 Drawing Figures

FASTENING ELEMENT WITH A CAVITY CONTAINING AN EXPLOSIVE CHARGE

The invention relates to a fastening element having a hollow body or casing provided with a cavity containing an explosive charge for anchoring the element during explosion thereof.

Fastening elements that contain explosive charges are conventional; they involve the explosive rivets successfully utilized for the repair of airplanes at military airfields. Such explosive rivets, however, can only be utilized in the specific fields of application suitable for rivets.

The invention is based on the problem of providing an explosive fastening element which can be driven into the material without requiring a prefabricated opening. In particular, a nail element is to be created which has the effect of a rivet in the component to be attached and the effect of a nail in the component to which the first-mentioned component is to be fastened.

This problem is solved by a fastening element having the features of a rivet and of a nail. An explosive rivet-nail element is thus produced, by means of which a simultaneous riveting and nailing step is carried out. This element can be used, for example, in the fastening of facings on the outside of unfinished buildings, inner panelings in closed rooms, or when fastening clamping collars for conduits. A pre-bored opening for the novel rivet-nail element is required merely in the component which is to be attached. The novel rivet-nail element need not be especially anchored in this bore opening, although this can be done additionally. By the riveting-nailing step, the novel fastening element is anchored in the manner of a rivet in the pre-bored hole of a first component to be attached, while simultaneously the nail is driven into a secnd component to which the first component is to be attached and, by means of the fastening element, the first component to be attached is fastened to the second component. The explosive charge is ignited by heat transmitted either by thermal conduction, for example by placing a soldering iron at the end of the fastening element, or by induction heat produced with the aid of a high-frequency generator device directly in the fastening element by electric induction without contact and without heating up the non-induced surroundings of the fastening element.

To effect the connection by means of the fastening element of this invention, suitable are parts of all kinds of materials, for example, synthetic resin, wood, slate, or metal.

With the aid of one advantageous embodiment, a fastening element is provided which can be extended in the manner of a telescope and thus is capable of bridging even large distances between the component to be fastened and the component to which the first-mentioned component is to be attached.

The spacing between the component to be attached or fastened and the component to which the first-mentioned part is to be attached can be adjusted advantageously by a spacer bushing initially provided at the fastening element according to another embodiment.

The fastening element can be provided with a head at the end where the explosive charge is located so that it can be passed through the component to be fastened. It is also possible to insert the fastening element of this invention with its end adjacent to the explosive charge in a blind hole in the component to be fastened, in which the end of the fastening element on the explosive charge side is then spread apart or anchored by a riveting effect.

In case the heat of ignition is transmitted to the explosive charge by heat conduction, the sleeve and/or the material of the novel fastening element surrounding the explosive charge consists preferably of a material of high heat conductivity, such as, for example, steel, iron, aluminum, or a copper alloy.

Additional details of the invention can be seen from the following description of several embodiments with reference to the drawings wherein.

Figure 3:
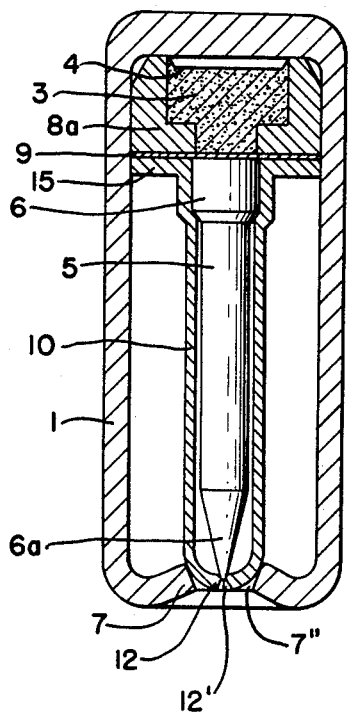
Figure 4:
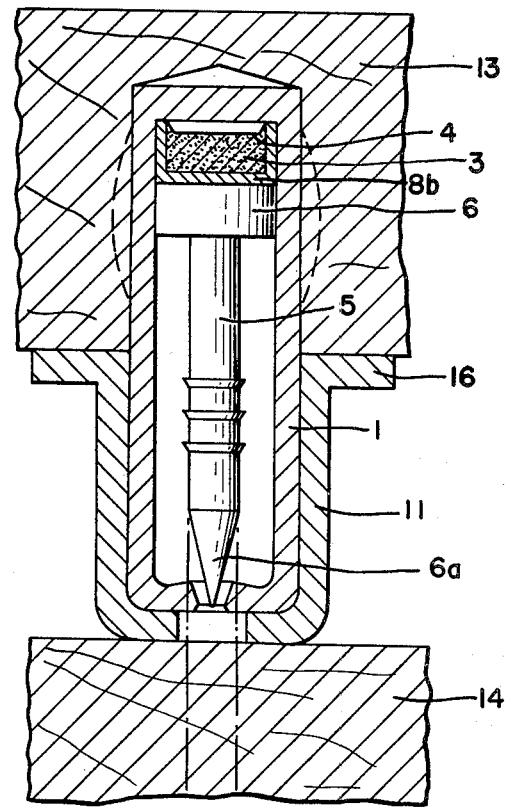

FIG. 3 shows an axial sectional view of a another embodiment of the fastening element according to this invention wherein the element is telescopically extended during the riveting and nailing process; and FIG. 4 shows an axial sectional view of a fourth embodiment of the fastening element according to the invention with a spacer bushing arranged thereat and showing the arrangement of the fastening element in the component to be fastened and also showing the component to which it is attached.

In the drawings, identical parts have the same reference numerals

Figure 1:
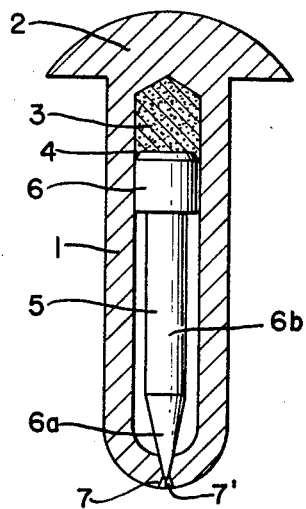
FIG. 1 shows an axial sectional view of a first embodiment of the fastening element of this invention.

FIG. 1 shows the basic construction of the novel fastening element. A metallic sleeve 1 is sealed at one end and contains at that point an explosive charge 3. At its other end, the sleeve 1 is folded shut or swaged, and the folded portion 7 leaves a small opening 7'. In the sleeve 1, a nail 5 is disposed having a shank 66, a tip 6a, and a head 6. The nail 5 is entirely housed within the sleeve 1; the head 6 adjoins the explosive charge 3 while the end of its tip 6a is located in the opening 7' left by the folded portion 7. The head 6 of the nail 5 is separated with respect to the explosive charge 3 by a cover layer 4 which consists of paper, for example.

The explosive charge 3 consists, for example, of a mixture of 50 to 70% by weight of a metallic powder, (e.g. iron) and the remainder a mixture of tetrazene and nitromannite. In this mixture, nitromannite can be replaced by nitrocellulose or pentaerythrol tetranitrate and iron powder can be replaced by powder of metallic aluminum, magnesium, or alloys of these metals.

At the folded portion 7 of the sleeve 1, the sleeve has a larger wall thickness. The folded portion retains the nail 5 at the lower end of its tip 6a.

The head 6 of the nail 5 is fashioned so that it can be displaced in the manner of a piston in the cavity of the sleeve 1, driven by the gases produced by the explosive charge 3 during the explosion. The shank 6b of the nail has a smaller diameter than the head 6, so that the head with the thus-formed shoulder forms a stop which is retained by the inner edge of the enlarged opening formed by the folded portion 7 during the displacement of the nail 5, and thus prevents a complete explusion of the nail 5 from the sleeve 1. To ensure this, the sleeve 1 has an enlarged wall thickness at the opening left free by the folded portion 7.

In the illustrated embodiment, the fastening element has a head 2 that is shaped to prevent a slipping of the fastening element through the pre-bored hole in the component to be fastened, in one direction.

Figure 2:
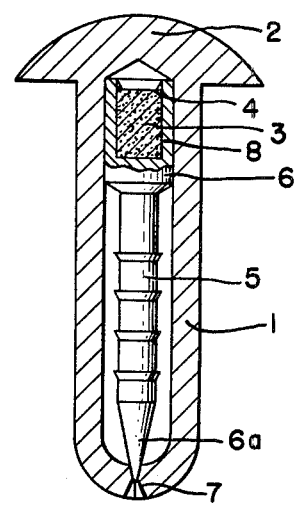
FIG. 2 shows an axial sectional view of another embodiment of the fastening element of this invention wherein the explosive charge is arranged in the head of the nail.

In the embodiment of FIG. 2, the explosive charge 3 is not directly accommodated in the cavity of sleeve 1, but rather is disposed in a cavity 8 in the head 6 of nail 5. This cavity 8 is open toward the sealed end of sleeve 1 and at this aperture the explosive charge 3 is protected by a cover 4, for example, made of a paper sheet.

FIG. 3 shows an embodiment of the fastening element of this invention wherein the element is extended telescopically during the riveting and nailing step. In this case, the nail 5 is not disposed directly in the outer sleeve 1 but is seated in an intermediate sleeve 10 which, in turn, is located within the outer sleeve 1.

Analogously to the basic embodiment, the intermediate sleeve 10 has, at its end on the side of or adjacent to the explosive charge, a flange 15 displaceable in the manner of a piston in the sleeve 1 upon the explosion of the explosive charge 3. With its other end, which is rounded, the sleeve 10 is housed in a —correspondingly large —opening 7" which is left free by the folded portion 7 of sleeve 1. A shoulder 17 at the sleeve 10 takes care of an additional positioning of nail 5 by the contact of nail head 6 with this shoulder, so that the nail 5 is fixed in position until the intentional deployment of the fastening element is ensured not solely by the folded portion 12 at the tip 6a of the nail.

At the sealed end, the explosive charge 3 is seated in the sleeve 1 in a dish 8a open toward the sealed end of the sleeve 1. The bottom of dish 8a adjoins the flange 15 of sleeve 10, a paper sheet 9 is being interposed. The bottom of dish 8a is perforated by a bore, covered by the sheet 9, and also filled by the explosive charge 3.

The sleeve 10 is thin-walled and is preferably made of steel. Analogously to sleeve 1 of the heretofore described simple embodiments, this sleeve 10 has a folded portion 12 with an opening 12' left free by this portion, in which the end of the tip 6a of the nail 5 is disposed. In contrast to sleeve 1, sleeve 10 is, however, left unsealed at the end oppositely to the folded portion 12, so that it is open rather than closed. In the open end the head 6 of the nail 5 is located, namely directly in front of the bore, likewise filled with explosive, in the bottom of dish 8a. The head 6 of nail 5 is displaceable in the sleeve 10 in the same way by means of the explosion gases as in case of sleeve 1 in the simple embodiments. Thus, it will be understood that the sleeve 10 is also displaced from the outer sleeve 1 as the nail 5 is displaced from sleeve 10.

FIG. 4 shows another variation for accommodating the explosive charge 3 in the sleeve 1. As can be seen from the drawing, the explosive charge 3 is pressed into a dish 8b which is open toward the sealed end of sleeve 1. At this point, the explosive charge 3, as in the other embodiments, is protected by a cover 4. To dish 8b is fashioned separately from the head 6 of the nail 5, and the head 6 of the nail contacts the bottom of dish 8b.

In FIG. 4, another version of the present fastening element is furthermore illustrated wherein the element has a spacer bushing 11. The spacer bushing 11 is pushed over the lower section of sleeve 1 and provided with a contact flange 16 at the end of its opening by means of which it is pushed over the sleeve 1. This contact flange 16 is supported on the surface of the component 13 to be fastened. At its other end, the spacer bushing 11 has a bottom in which a bore is provided for the penetration of nail 5.

Independently of the depth of the pre-bored hole in the component 13 to be fastened, into which the fastening element including the sleeve 1 is inserted, the contact flange 16 determines the depth of such insertion. By placing the bottom of the spacer bushing 11 against part 14, to which the first-mentioned component 13 is to be attached, an exactly defined spacing is thus established between the component 13 to be fastened and the component 14.

The functioning of the fastening element according to this invention can be seen best from FIG. 4. When heating the explosive charge 3 about 160° C., the explosive is ignited and drives the nail 5 from the sleeve 1 through the opening left by the folded portion 7. During this step the folded portion 7 is expanded by the wedge effect of the tip 6a of nail 5, but only to such an extent that the shank of the nail 5 will penetrate. At the same time, due to the explosion, a riveting effect is achieved in that sleeve 1 is bulged outwardly in the zone of the explosive charge 3. Thereby, the sleeve 1 is anchored in the component 13 to be fastened, as illustrated in dashed lines in FIG. 4. The head 6 of nail 5, driven in the manner of a piston by the explosion gases is stopped at the end of its stroke by the opening left by the folded portion 7, which has been widened only up to the diameter of the nail shank. The nail 5 then sits with tip and shank in component 14, to which the component 13 to be fastened was supposed to be attached.

In the embodiment according to FIG. 3, the nail 5 is advanced within the intermediate sleeve 10 to such an extent that its head 6 is stopped by the folded portion 12 of the intermediate sleeve 10. Likewise, the intermediate sleeve 10 is driven out through the folded portion 7 of sleeve 1 until its flange 15 is abuts the folded portion 7. The fastening element is thus telescopically extended in this embodiment.

What is claimed is:

1. A fastening element that has a cavity containing an explosive charge arranged so that due to the explosion of the explosive charge anchoring of the fastening element within a bore of a workpiece takes place automatically and that functions as a rivet-nail combination, said element comprising sleeve means defining the cavity containing the explosive charge at one end and providing an aperture at the other end, and a nail disposed within said sleeve means, said nail comprising a head, a shank, and a tip and being arranged to be driven out through the aperture formed in said other end; the head of the nail acting as a piston which can be driven by explosion of the explosive charge and as a stop which arrests the driving-out movement when the shank of the nail has passed through said aperture.

2. A fastening element according to claim 1, wherein said sleeve means comprises a sleeve of deformable material that is closed and sealed at one end and partially closed at the other end to provide said aperture at said other end, said one end defining the cavity containing said explosive charge.

3. A fastening element according to claim 2, wherein the nail is seated with the end of the tip in the aperture of the partially closed end, and the head is displaceable direcly within the sleeve.

4. A fastening element according to claim 3, wherein the explosive charge is pressed into the cavity of the sleeve.

5. A fastening element according to claim 3, wherein the head of the nail also has a cavity open toward the closed sealed end of the sleeve into which the explosive charge is pressed.

6. A fastening element according to claim 3, wherein the explosive charge is pressed into a dish separated from the head of the nail and is open toward the closed end of the sleeve, the head of the nail being in contact with the bottom of the dish.

7. A fastening element according to claim 1, wherein said sleeve means includes an outer sleeve of deformable material and an intermediate sleeve located within said outer sleeve, said outer sleeve being closed and sealed at one end and partially closed at the other end to provide an aperture at said other end, the one end of the outer sleeve defining the cavity containing the explosive charge, and said intermediate sleeve having an opening at one end adjacent to the explosive charge and having a flange surrounding said opening, said intermediate sleeve being partially closed to provide another smaller opening at the other end, and said nail being seated in said intermediate sleeve wherein the nail can be driven out of the intermediate sleeve by explosion of the explosive charge until the head abuts the partially closed end of the intermediate sleeve and wherein the intermediate sleeve has its partially closed end seated in the aperture formed by the open end of the outer sleeve of the deformable material so that the flange of the intermediate sleeve operates as a piston drivable by the explosive charge in the sleeve of deformable material and as an abutment which stops this driving-out movement at the open end of the sleeve of deformable material.

8. A fastening element according to claim 7, wherein the explosive charge is pressed into a dish open toward the closed end of the outer sleeve, the flange of the intermediate sleeve contacting the bottom of this dish, and the bottom of the dish being perforated by a bore, that is filled with the explosive charge in front of the head of the nail.

9. A fastening element according to claim 1, wherein the wall thickness of the sleeve means is reinforced at the aperture provided at the partially closed end.

10. A fastening element according to one of claims 2-9, wherein the sleeve of deformable material has at the one end containing the explosive charge an anchoring head means for providing an enlarged head portion which retains the fastening element within the bore of said workpiece.

11. A fastening element according to one of claims 2-10, wherein a spacer bushing is placed on the section of the sleeve of deformable material on the side of the partially closed end, said spacer bushing being sealed on one side by a bottom portion having a bore for the penetration of the nail and/or of the intermediate sleeve, and the spacer bushing being pushed onto the sleeve of deformable material up to this bottom portion, and wherein the spacer bushing has a contact flange at its upper open end.

12. A fastening element according to one of claim 2-9, wherein the sleeve of deformable material as well as optionally the dish or the head of the nail are made of a metal of high heat conductivity.

13. A fastening element according to claim 11, wherein the metal of high heat conductivity is steel, aluminum or a copper alloy.

14. A fastening element according to claim 7, wherein the intermediate sleeve has a shoulder abutment contacted by the head of the nail by means of a corresponding shoulder on said head.

15. A fastening element according to claim 2, wherein the deformable material comprises iron, steel, copper, aluminum, or alloys of copper, the nail is made of metal capable of deforming said deformable material and the explosive charge comprises mixtures of metal powder with nitrocellulose or nitromannite, wherein the metal powder can be iron, aluminum or magnesium or alloys of these light metals.

16. A fastening element according to claim 1, wherein said sleeve means includes a sleeve made of deformable material, one end of the sleeve defining said cavity and being expanded during explosion of said explosive charge to effect anchoring of said fastening element within said bore of the workpiece in which the one end of the sleeve means is located.

17. A fastening element according to claim 1 or claim 16, wherein said sleeve means defines a closed cavity containing the explosive charge at one end of said sleeve means, the head of the nail being retained within the sleeve means whereby the fastening element secures the workpiece in which the fastening element is located and a workpiece into which the nail is driven upon explosive of said explosive charge.

18. A fastening element according to claim 16, wherein said sleeve defines said cavity, one end of the cavity being closed by the head of said nail.

19. A fastening element according to claim 16, wherein said explosive charge is a heat-activated explosive material.

20. A fastening element according to claim 16, wherein said explosive charge is an induction heat-activated explosive material.

21. A fastening element according to claim 16, wherein said sleeve means includes a sleeve of deformable material that completely encloses all portions of the nail except the tip, the tip extending within the aperture provided in an end of said sleeve, the head of the nail being retained within said sleeve after explosion of said explosive charge, and said sleeve remaining intact after said explosion.

* * * * *